United States Patent
Grossmann

(10) Patent No.: US 6,940,871 B1
(45) Date of Patent: Sep. 6, 2005

(54) RESERVED-CAPACITY METHOD FOR DIGITAL DATA TRANSMISSION NETWORKS AND DATA SWITCHING CENTER

(75) Inventor: Bernd Grossmann, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/889,498

(22) PCT Filed: Jan. 13, 2000

(86) PCT No.: PCT/EP00/00243

§ 371 (c)(1),
(2), (4) Date: Jul. 17, 2001

(87) PCT Pub. No.: WO00/42812

PCT Pub. Date: Jul. 20, 2000

(30) Foreign Application Priority Data

Jan. 18, 1999 (EP) .................................. 99101001

(51) Int. Cl.⁷ ............................................... H04J 3/16
(52) U.S. Cl. ..................................................... 370/468
(58) Field of Search ................................ 370/468, 395, 370/477, 232, 230, 229, 236–238; 709/226, 709/233, 249; 707/10

(56) References Cited

U.S. PATENT DOCUMENTS

| | | | | |
|---|---|---|---|---|
| 5,404,505 A | * | 4/1995 | Levinson | .................. 707/10 |
| 6,094,431 A | * | 7/2000 | Yamato et al. | ......... 370/395.21 |
| 6,470,029 B1 | * | 10/2002 | Shimizu | ................... 370/468 |
| 6,597,659 B1 | * | 7/2003 | Klay et al. | ................... 370/229 |
| 6,760,774 B1 | * | 7/2004 | Soumiya et al. | ............ 709/233 |

FOREIGN PATENT DOCUMENTS

| | | |
|---|---|---|
| EP | 0 388 951 | 9/1990 |
| EP | 0 798 942 A2 | 10/1997 |
| WO | WO 97/22224 | 6/1997 |

* cited by examiner

Primary Examiner—Kwang Bin Yao
Assistant Examiner—Prenell Jones
(74) Attorney, Agent, or Firm—Bell, Boyd & Lloyd LLC

(57) ABSTRACT

A method, and data switching center, for reserving transmission capacities and for selecting requests for data streams of different bandwidth to be transmitted in digital data transmission networks. The method and the data switching center are characterized by the fact that a request for transmitting data having a certain bandwidth is accepted only if the unused data transmission capacity is greater than or equal to the sum of the reserved data transmission rates, with the exception of the reserved data transmission rate for the requesting bandwidth or bandwidth group, even after the transmission has been accepted.

10 Claims, 6 Drawing Sheets

RESERVED-CAPACITY METHOD FOR DIGITAL DATA TRANSMISSION NETWORKS AND DATA SWITCHING CENTER

BACKGROUND OF THE INVENTION

1. Field of the Invention

The present invention relates to a method for reserving transmission capacities and for selecting requests for data streams of different bandwidth to be transmitted in digital data transmission networks having a maximum transmission rate, a particular transmission capacity being available which is less than or equal to the maximum transmission rate and, furthermore, certain bandwidths or bandwidth groups having particular data transmission rates in use. Certain data transmission rates $r_i$ are reserved for certain bandwidths or bandwidth groups $b_i$, and a request for transmitting data having a particular bandwidth or bandwidth group $b_j$ only is accepted if predetermined criteria with respect to the utilization of the data network are met. In addition, the present invention relates to a data switching center.

2. Description of the Prior Art

Digital data transmission networks such as, for example, digital wire-connected telecommunication networks, mobile radio networks or ATM networks, pose the problem of appropriately dividing the total data transmission capacity over various services of different bandwidth. An example of this is the ISDN (Integrated Services Digital Network) which transmits voice data traffic in parallel at 1×64 kbit/s, pure data traffic at 128 kbit/s=2×64 kbit/s and video signals at 384 kbit/s=6×64 kbit/s. If a number of users are simultaneously dialing in for the individual services, there must be a decision criterion according to which the requirements for data transmission of the users are regulated and the total data transmission capacity is distributed over the services and within the services of different bandwidths.

It is obvious that the type of distribution of the data transmission capacity over the individual services is an essential criterion for the effectiveness and operational reliability of the data network. The aim of the distribution criterion is that the network:

is to operate effectively and with little blocking probability even at the edge of its design capacity;
is to respond flexibly to different load requirements of different bandwidths;
should be stable in the case of small deviations from its design capacity;
a large overload at one bandwidth should not trigger any blocking of other bandwidths;
both bandwidths of different magnitude should be treated with approximately equal chances ("fairness"); and
the administration of the data traffic should be simple.

Different distribution criteria and algorithms can be used for largely meeting the abovementioned criteria.

For example, certain transmission channels can be unambiguously allocated to each bandwidth. This prevents any blocking of a bandwidth by another bandwidth. The disadvantage of this is that there is no flexibility for distributing the transmission capacity and, thus, an ineffective mode of operation results with changing requirements.

Another possibility lies in the entire transmission capacity being unrestrictedly available to all bandwidths up to the limit of capacity. Although this makes it possible to achieve optimum utilization, there is the possibility that the transmission of individual bandwidths is blocked by other bandwidths due to the high utilization of the data network. If a maximum capacity is reserved for each individual bandwidth in an improvement of this method, this leads to good protection against blocking between the bandwidths but to a low system efficiency.

Another possibility lies in basically providing the total transmission capacity to all bandwidths but to stop requests for transmitting data of a particular bandwidth as soon as the total available data transmission capacity drops below a certain threshold value. This method is called "sum limitation" or "trunk reservation" and is, in most cases, used together with priority allocations for certain requirements. The disadvantage of this method is that reservations are still maintained even at high overloads of certain bandwidths and, as a result, free capacity is wasted. This results in higher blocking probabilities for the other bandwidths in each case.

A method for reserving transmission capacities, and for selecting requirements for data streams of different bandwidth to be transmitted in digital data transmission networks having a maximum transmission rate, similar to the present invention, is known from European patent application EP 0 449 480 A3. In this document, it is proposed to accept a request for transmission of data having a certain bandwidth $b_j$ only if predetermined criteria with respect to the utilization of the data network are met. In this arrangement, various criteria are proposed, all of which relate to a dynamically varying total reserved data transmission capacity.

Furthermore, reference is made to the European Patent Application EP 0 798 942 A2 which discloses a method for reserving transmission capacities and for selecting requirements for data streams of different bandwidth to be transmitted in digital data transmission networks with a maximum transmission rate $b_{max}$, such that:

a particular transmission capacity is available which is smaller than or equal to the maximum transmission rate $b_{max}$;
certain bandwidths or bandwidth groups $b_i$ having data transmission rates $s_i$ are in use;
certain data transmission rates $r_i$ are reserved for certain bandwidths or bandwidth groups $b_i$;
a request for transmitting data having a particular bandwidth or bandwidth group $b_j$ only is accepted if predefined criteria with respect to the utilization of the data network are met; and
a request for transmitting data having a certain bandwidth $b_j$ is accepted only if the unused data transmission capacity is greater than or equal to the sum of the reserved data transmission rates, with the exception of the reserved data transmission rate $r_j$ for the requesting bandwidth or bandwidth group $b_j$ even after the transmission has been accepted.

It is, therefore, an object of the present invention to specify another method for reserving transmission capacities and for selecting requests for data streams of different bandwidths to be transmitted in digital data transmission networks having a maximum transmission rate with an improved and simplified criterion for the acceptance or rejection of a request for data transmission. It is a further object of the present invention to specify a data switching center which has an improved algorithm for accepting or rejecting a request for data transmission.

SUMMARY OF THE INVENTION

Accordingly, the present invention proposes to improve the known method for reserving transmission capacities and for selecting requests for data streams of different bandwidth which are to be transmitted in digital data transmission networks having a maximum transmission rate. In the case of this method, a particular transmission capacity is available which is less than or equal to the maximum transmission rate and, furthermore, certain bandwidths or bandwidth groups have particular data transmission rates in use, certain data transmission rates $r_i$ are reserved for certain bandwidths or bandwidth groups $b_i$, a request for transmitting data having a particular bandwidth or bandwidth group $b_j$ is only accepted if predetermined criteria with respect to the utilization of the data network are met, and a request for transmitting data having a certain bandwidth $b_j$ is accepted only if the unused data transmission capacity is greater than or equal to the sum of the reserved data transmission rates, with the exception of the reserved data transmission rate $r_j$ for the requesting bandwidth or bandwidth group $b_j$, even after the transmission has been accepted. The improvement is designed such that:

particular data transmission rates $r_i$ (with i=1 to n) are reserved for n bandwidths or bandwidth groups $b_i$ (with i=1 to n);

threshold values $p_i$ (with i=1 to n) are established for each particular bandwidth or bandwidth group $b_i$;

the loading $s_i$ of the data transmission network with respect to the individual bandwidths $b_i$ is observed;

when a loading $s_j$ of the threshold value $p_j$ (with j element of values i) of the bandwidth or bandwidth group $b_j$ is exceeded, the reservation of data transmission rates $r_j$ is canceled for this bandwidth or bandwidth group $b_j$; and the request for transmitting data having this particular bandwidth or bandwidth group $b_j$ is only accepted if the unoccupied data transmission capacity then available can still meet all reservations $r_k$ (with k=1 to j−1 and j+1 to n) of all remaining bandwidths or bandwidth groups $b_k$ with uncancelled reservations even after the request has been accepted.

An advantageous embodiment of the method of the present invention provides can consist in that the reserved data transmission rates $r_i$ are integral multiples (with ri=n*bi and n=0, 1, 2, . . . ) of the respective bandwidths or of the largest bandwidth of the respective bandwidth group $b_i$. The result of this measure is that no unnecessary capacity is wasted in the reserved data transmission rates $r_i$.

Another embodiment of the present invention provides that a second threshold value $pp_i$ which is smaller than the first threshold value $p_i$ is determined at least for a bandwidth $b_i$, and when this threshold value ppi of the data transmission load $s_i$ utilized is reached, the value of the reserve data transmission capacity $r_i$ is reduced.

According to the current data transmission standards, it is advantageous if the bandwidths $b_i$ are assumed to be integral multiples of 64 kbit/s (N×64 kbit/s).

The method according to the present invention can be advantageously used in a digital telecommunication network, especially an ISDN network, a digital mobile radio network or also in an ATM (asynchronous transfer mode) network.

According to the present invention, a data switching center is also proposed which can carry out the method represented above. Such embodiment includes microprocessor-controlled switching facilities, the programming of which exhibits algorithms according to the method according to the present invention.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
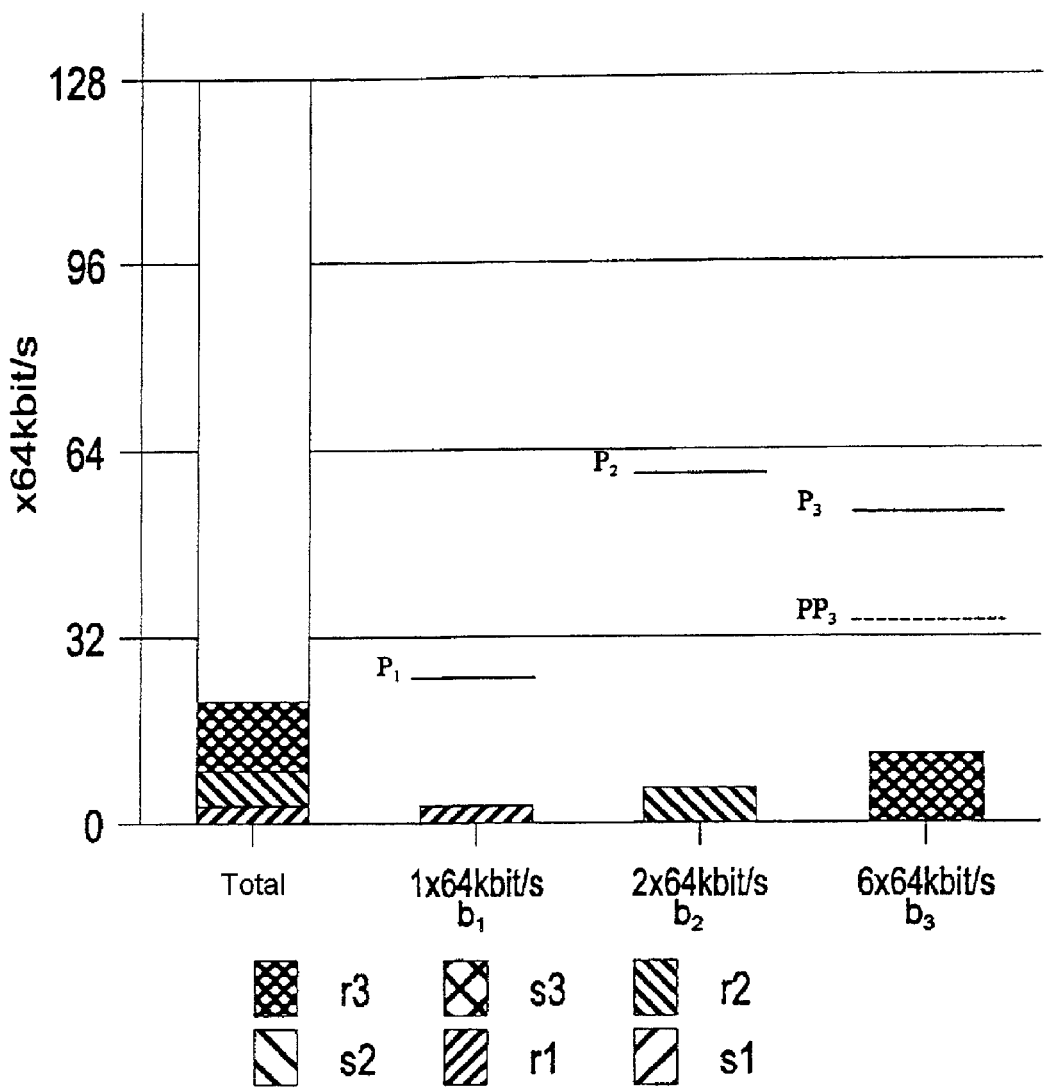
FIG. 1 shows a diagrammatic representation of the utilization and reservation situation of a data transmission link with no data traffic occurring.

FIG. 1 diagrammatically shows the utilization and reservation situation of a data transmission link in which there is no data traffic taking place. Along the ordinate, the data transmission capacity is plotted in integral multiples of 64 kbit/s and along the abscissa, the total capacity of the data transmission system is shown in a bar chart, the individual reserved data transmission capacities $r_1$ to $r_3$ being shown shaded within the total capacity. Adjacently to the right of that, the transmission capacities utilized and reserved by the individual bandwidths $b_1$ to $b_3$ are set up.

Three bandwidths $b_1$ with one times 64 kbit/s, $b_2$ with twice 64 kbit/s and $b_3$ with six times 64 kbit/s are again shown separately, by way of example. Since there is no data traffic in the present case, the bars above the corresponding bandwidths in each case consist only of the reserved data transmission capacity $r_1$ to $r_3$. In addition, the magnitude of the fixed threshold values $p_1$ to $p_3$ is drawn allocated to the corresponding bandwidths and the second threshold value $pp_3$ is drawn for bandwidth $b_3$.

In addition, the shading relationships are shown in this and in all other figures, and below these the numerical values of the corresponding bars are shown in a table.

Figure 2:
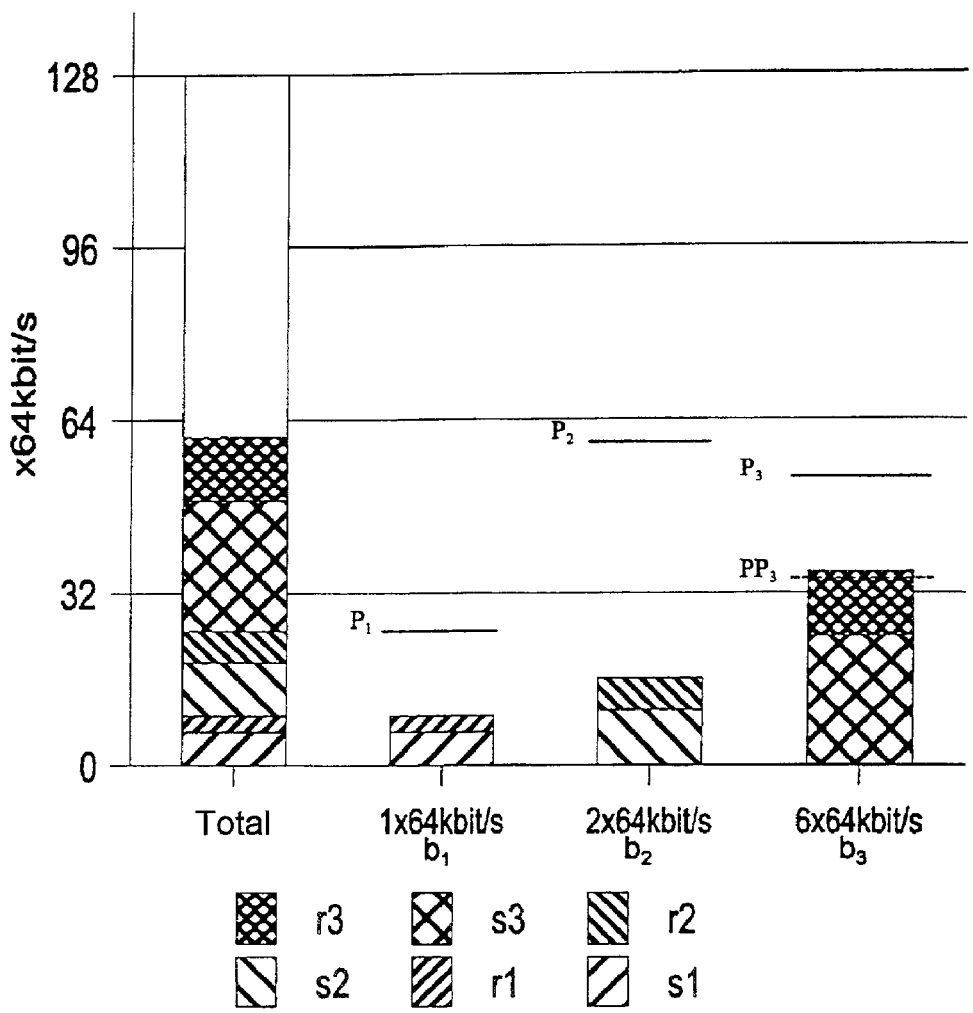
FIG. 2 shows a load situation of a data transmission network having low load.

FIG. 2 shows a load situation of the data transmission network with low load. The left-hand bar shows the total data transmission capacity as it is divided into the utilized areas $s_1$ to $s_3$ and the reserved areas $r_1$ to $r_3$ of the individual bandwidths and an additional free data transmission capacity which is available for everyone. On the right-hand side, the corresponding divisions are allocated to the individual bandwidths $b_1$ to $b_3$. In the bandwidths, the individual data transmission capacities $s_1$ to $s_3$ used are in each case shown, and the reserved data transmission capacity $r_1$ to $r_3$ allocated to the respective bandwidth. In addition, the predetermined threshold values $p_1$ to $p_3$ are specified for the individual bandwidths. Also, a second threshold value $pp_2$, starting from which the reserved data transmission capacity of this bandwidth decreases, is also shown at bandwidth $b_2$. All bandwidths are utilized to a relatively low degree so that the sum of the reserved bandwidths $r_1$ to $r_3$ is much smaller than the free data transmission capacity accessible to all bandwidths. The threshold $p_i$ is not reached in any bandwidth and there is no protective mechanism in force. Thus, new requests for data transmission can be accepted without restriction.

Figure 3:
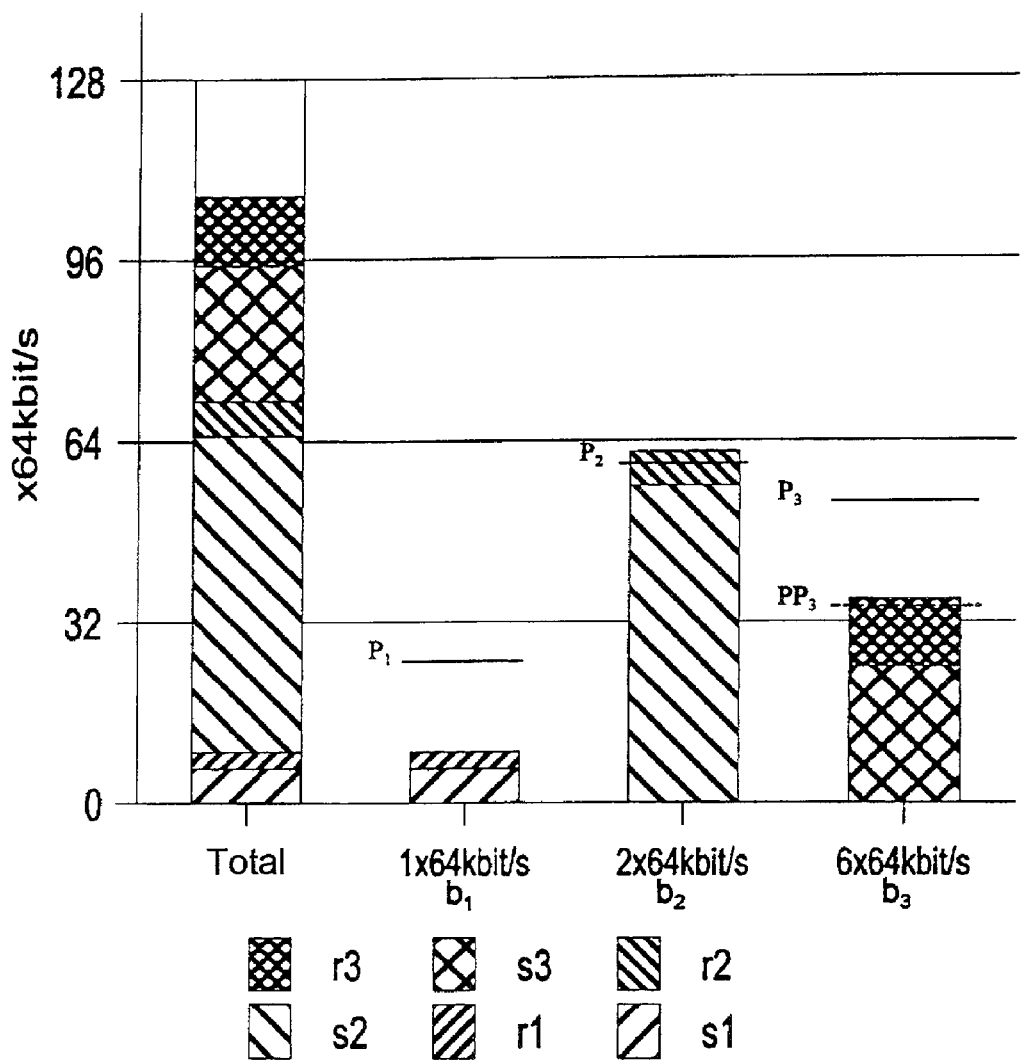
FIG. 3 shows a load situation of a data transmission network having a data traffic volume just below a maximum threshold.
Figure 4:
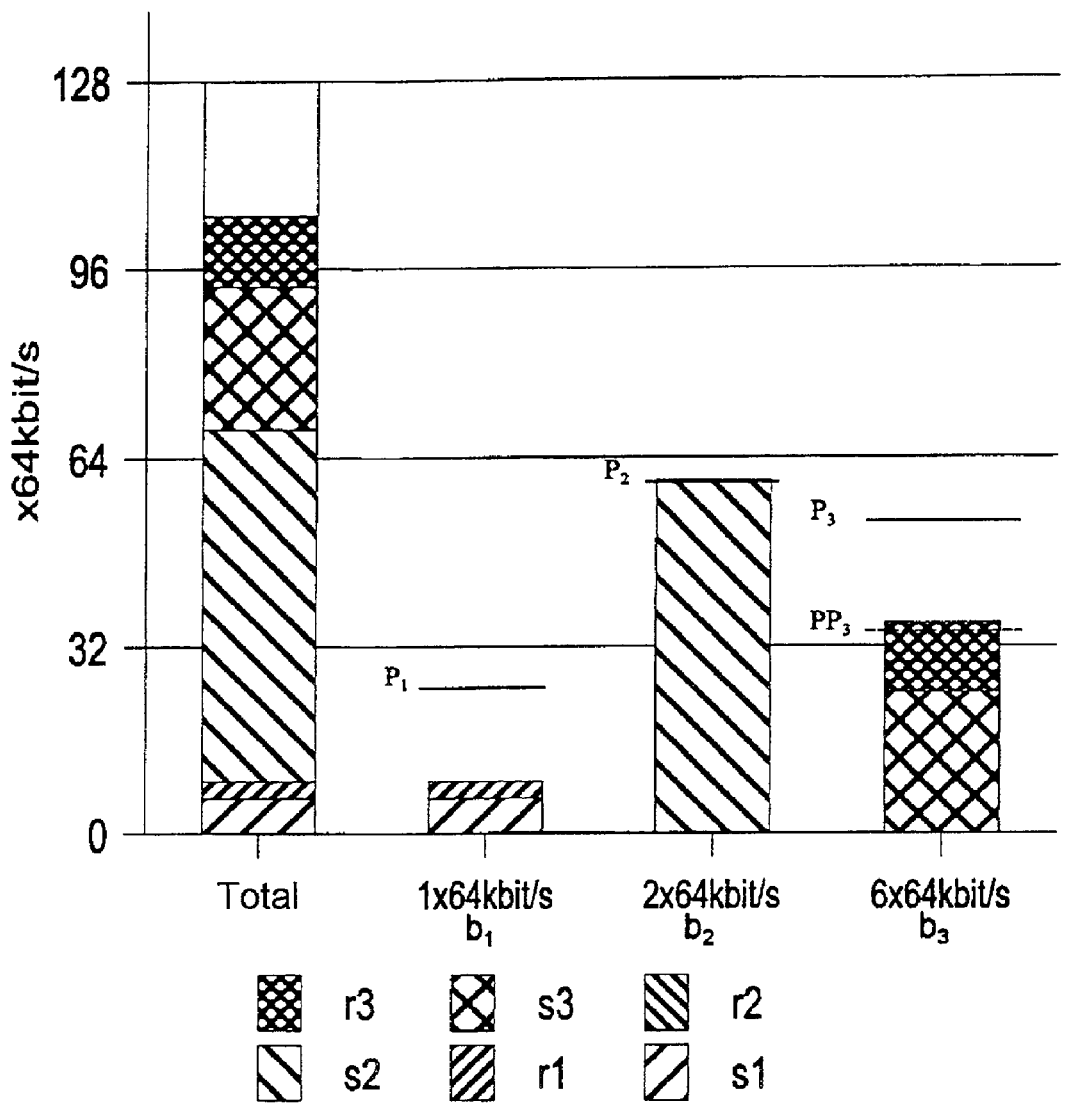
FIG. 4 shows a load situation of a data transmission network as in FIG. 3, whereupon a further request for data transmission is made.

FIG. 3 shows a load situation of the data transmission network in which a data traffic volume which is just below the threshold $p_2$ already exists in bandwidth $b_2$. If a further request for data transmission is made for this bandwidth $b_2$, a situation as shown in FIG. 4 results in accordance with the present invention. Although the request for $b_2$ has been accepted here since the magnitude of the total unused data transmission capacity is greater than the sum of the reserved data transmission capacities $r_1$ and $r_3$ of the other bandwidths, the reserved data transmission capacity $r_2$ is canceled since the threshold $p_2$ has been exceeded for $b_2$, and thus additional freely available data transmission capacity is provided.

Figure 5:
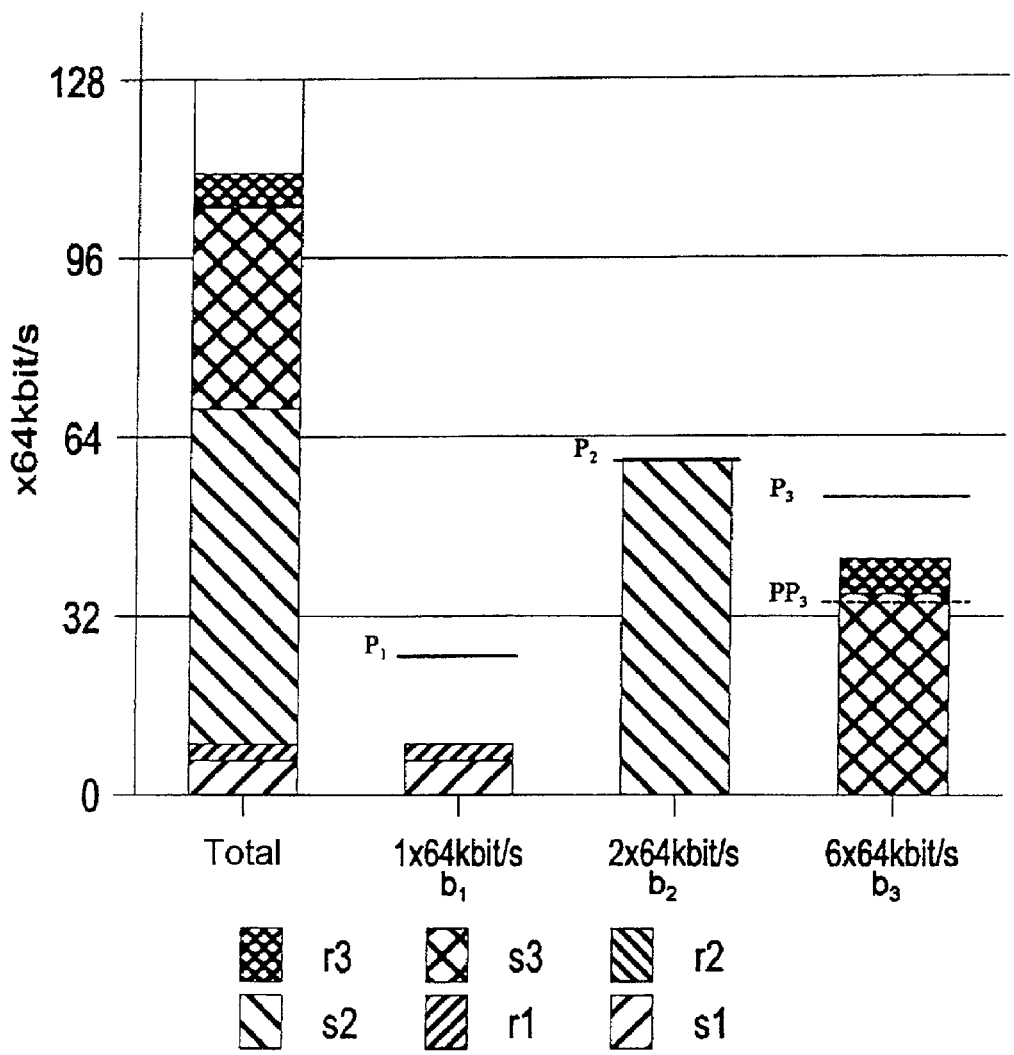
FIG. 5 shows an effect of a transgression of a second threshold value on reserved data transmission capacity in a data transmission network.

In FIG. 5, finally, the effect of a transgression of the second threshold value $pp_3$ (if such a threshold value has been determined) on the reserved data transmission capacity $r_3$ is shown via bandwidth $b_3$. When this threshold value $pp_3$ is exceeded, the reserved data transmission capacity $r_3$ is reduced by a certain factor, by one half in this case. Due to this reduction of the reserved capacities, the freely available area is correspondingly increased and provides slightly more free data transmission capacity for all bandwidths in situations of high loading.

Figure 6:
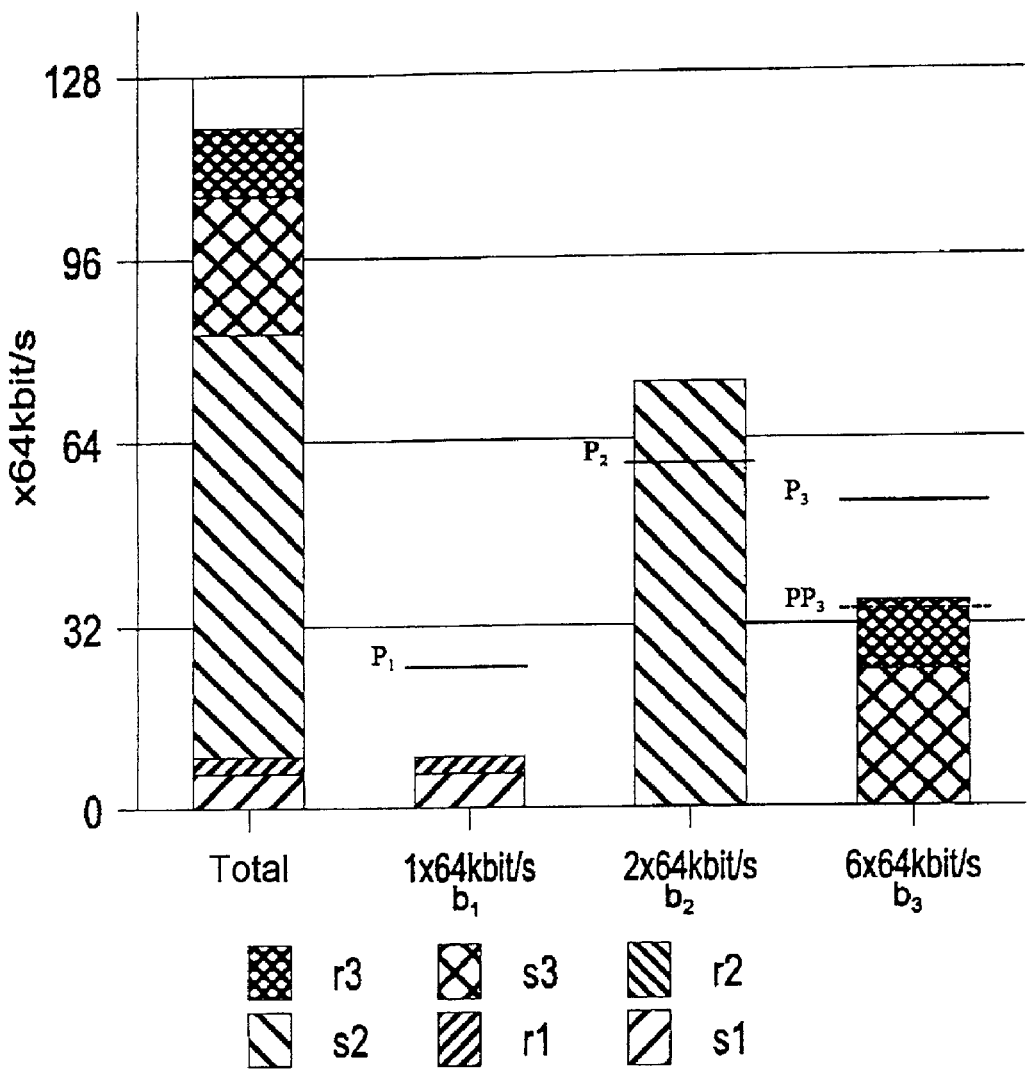
FIG. 6 shows a load situation of the data transmission network wherein the load on first and second bandwidths is so low that reservations on first and third bandwidths are active and, at the same time, the loading by the second bandwidth is so great that there is no more associated reservation.

Although the load situation of the data transmission network is already relatively high in FIGS. 3–5 and the reservations for the data transmission capacity have been partially canceled, requests for data transmission can still be accepted for all bandwidths since, in spite of the additional transmission, the unused capacity of the data transmission network still remains greater than the reserved capacities of the other bandwidths. However, this situation changes with a load situation as shown in FIG. 6. The load on the bandwidths $b_1$ and $b_2$ is so low in this case that reservations $r_1$ and $r_3$ are active. At the same time, the loading by bandwidth $b_2$ is so great that there is no more reservation in this case. In addition, the free data transmission capacity has shrunk greatly due to the high utilization rate.

According to the present invention, a request for further data transmission with bandwidth $b_2$ is rejected under this load situation since the sum of $r_1$ and $r_3$ would be greater than the unused capacity then still remaining with an imagined acceptance of the request.

Another request for further data transmission with bandwidth $b_1$ would be accepted since the sum of $r_2$ and $r_3$ ($r_2$ having the value 0 since this reservation has already been canceled) would be less than the unused capacity then still remaining with an imagined acceptance of this request. Similarly, a possible request for data transmission with bandwidth $b_3$ would be accepted on the basis of the same criteria.

Overall, the method of the present invention with, respectively, a switching center equipped to carry out this method, has the result that the data transmission network operates effectively and with little blocking probability even at the edge of its design capacity. In addition, it responds flexibly to different load requirements of different bandwidths, is stable in the case of small deviations from its design capacity, does not trigger any blocking of other bandwidths with a large overload of one bandwidth, both treats bandwidths of different magnitude with approximately equal chances, i.e. behaves "fairly", and, finally, allows very simple administration of the data traffic due to the simple algorithm.

Although the present invention has been described with reference to specific embodiments, those of skill in the art will recognize that changes may be made thereto without departing from the spirit and scope of the invention as set forth in the hereafter appended claims.

What is claimed is:

1. A method for reserving transmission capacities and for selecting requests for data streams of different bandwidths to be transmitted in digital data transmission networks having a maximum transmission rate, the method comprising the steps of:

making available a particular transmission capacity which is less than or equal to the maximum transmission rate;

reserving particular data transmission rates for particular bandwidths or bandwidth groups;

establishing threshold values for each of the particular bandwidths or bandwidth groups;

effecting a loading of a data transmission network with respect to the particular bandwidths or bandwidth groups;

canceling a reservation of data transmission rates for the particular bandwidth or bandwidth group when a loading of the threshold value of the particular bandwidth or bandwidth group is exceeded; and accepting a request for transmitting data having the particular bandwidth or bandwidth group only if an unoccupied data transmission capacity then available can still meet all reservations of all remaining bandwidths or bandwidth groups with uncancelled reservations even after the request has been accepted.

2. A method for reserving transmission capacities and for selecting requests for data streams of different bandwidths to be transmitted in digital data transmission networks having a maximum transmission rate as claimed in claim 1, wherein the reserved data transmission rates are integral multiplies of, respectively, the particular bandwidth or a greatest bandwidth of the particular bandwidth group.

3. A method for reserving transmission capacities and for selecting requests for data streams of different bandwidths to be transmitted in digital data transmission networks having a maximum transmission rate as claimed in claim 1, wherein upon acceptance of the request for transmission, a reserved area of the data transmission rate is occupied, at least partially, if there is no other free data transmission capacity available.

4. A method for reserving transmission capacities and for selecting requests for data streams of different bandwidths to be transmitted in digital data transmission networks having a maximum transmission rate as claimed in claim 3, wherein if a reserved data transmission capacity is completely utilized, no further requests for transmitting data having this particular bandwidth or bandwidth group are accepted.

5. A method for reserving transmission capacities and for selecting requests for data streams of different bandwidths to be transmitted in digital data transmission networks having a maximum transmission rate as claimed in claim 1, further comprising the steps of:

determining a second threshold value which is smaller than the first threshold value for a particular bandwidth;

reducing a value of reserved data transmission capacity when the second threshold value of the data transmission load is reached.

6. A method for reserving transmission capacities and for selecting requests for data streams of different bandwidths to be transmitted in digital data transmission networks having a maximum transmission rate as claimed in claim 1, wherein the particular bandwidths are integral multiples of 64 kbit/s.

7. A method for reserving transmission capacities and for selecting requests for data streams of different bandwidths to be transmitted in digital data transmission networks having a maximum transmission rate as claimed in claim 1, wherein the data transmission network is an ISDN digital telecommunication network.

8. A method for reserving transmission capacities and for selecting requests for data streams of different bandwidths to be transmitted in digital data transmission networks having a maximum transmission rate as claimed in claim 1, wherein the data transmission network is a digital mobile radio network.

9. A method for reserving transmission capacities and for selecting requests for data streams of different bandwidths to be transmitted in digital data transmission networks having a maximum transmission rate as claimed in claim 1, wherein the data transmission network is an ATM network.

10. A data switching center for reserving transmission capacities and for selecting requests for data streams of different bandwidths to be transmitted in digital data transmission networks having a maximum transmission rate, the data switching center comprising:

means for making available a particular transmission capacity which is less than or equal to the maximum transmission rate;

means for reserving particular data transmission rates for particular bandwidths or bandwidth groups;

means for establishing threshold values for each of the particular bandwidths or bandwidth groups;

means for effecting a loading of a data transmission network with respect to the particular bandwidths or bandwidth groups;

means for canceling a reservation of data transmission rates for a particular bandwidth or bandwidth group when a loading of the threshold value of the particular bandwidth or bandwidth group is exceeded; and means for accepting a request for transmitting data having the particular bandwidth or bandwidth group only if an unoccupied data transmission capacity then available can still meet all reservations of all remaining bandwidths or bandwidth groups with uncancelled reservations even after the request has been accepted.

* * * * *